(12) United States Patent
Simpson

(10) Patent No.: US 6,788,775 B1
(45) Date of Patent: Sep. 7, 2004

(54) SYSTEM AND METHOD FOR PASSCODE VALIDATION DURING TELEPHONE CALL PROCESSING

(75) Inventor: Anita Hogans Simpson, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 508 days.

(21) Appl. No.: 09/734,125

(22) Filed: Dec. 11, 2000

(51) Int. Cl.[7] .............................................. H04M 3/42
(52) U.S. Cl. .............................. 379/207.13; 379/201.03
(58) Field of Search ......................... 379/93.02, 93.04, 379/207.13

(56) References Cited

U.S. PATENT DOCUMENTS

| | | | | |
|---|---|---|---|---|
| 5,301,246 A | * | 4/1994 | Archibald et al. ..... | 379/142.06 |
| 5,430,719 A | | 7/1995 | Weisser ..................... | 370/389 |
| 5,901,284 A | * | 5/1999 | Hamdy-Swink ............ | 713/200 |
| 6,356,887 B1 | * | 3/2002 | Berenson et al. .............. | 707/2 |

* cited by examiner

Primary Examiner—Ahmad F. Matar
Assistant Examiner—Quynh H. Nguyen
(74) Attorney, Agent, or Firm—Woodcock Washburn LLP

(57) ABSTRACT

A method of validating a passcode in a telephone network comprises using a hash function to hash the directory number of a subscriber to a passcode-controlled service and comparing an entered passcode with the output of the hash function. Each subscriber to a passcode-controlled service is provided with a passcode that is equal to the hash of their directory number produced by a predetermined hash function, and that predetermined hash functions is provided to the various components of the network that may need to validate the subscriber's passcode. Each component of the network is thus able to validate the passcode without performing a database lookup.

9 Claims, 6 Drawing Sheets

SYSTEM AND METHOD FOR PASSCODE VALIDATION DURING TELEPHONE CALL PROCESSING

FIELD OF THE INVENTION

The present invention relates generally to the field of telephony and, more particularly, to a method of validating a passcode or personal identification number (PIN) during telephone call processing.

BACKGROUND OF THE INVENTION

Modern telephone networks provide numerous services to their customers. Examples of such services are caller ID and voice mail. In the context of many of these services, it is often desirable to control access to the service by means of a personal identification number (PIN) or "passcode." For example, a voice mail service may require entry of a passcode before permitting a subscriber of the service to retrieve voice messages or change a greeting. Another example is a "privacy manager" service (as described in U.S. patent application Ser. No. 09/372,676, entitled "System and Method for Privacy Management," incorporated herein by reference), wherein a subscriber's line is configured to prompt the caller to "unblock" a caller-ID-blocked number prior to terminating the call to the subscriber's line. In the case where the subscriber is calling his own line from a remote location, he or she may enter a passcode in order to "override" the privacy manager service, thereby allowing the call to be terminated to his or her line without recording his or her name or unblocking the calling number. Such scenarios are examples of passcode-controlled services.

Typically, when a customer of a telephone network has subscribed to a passcode-controlled service, the provider of the telephone network maintains a database that correlates customers with their passcodes. Thus, whenever a component of the network needs to validate a passcode that the customer has entered, such component queries the database in order to obtain the customer's passcode and then compares the entered passcode with the passcode in the database.

However, in a telephone network with distributed components, storage of passcodes in a database leads to the transmission of large amounts of data. Typically, the database is stored centrally, which means that every component that needs to validate a passcode must query the database over a data network at the time of validation. In this typical case, there must be a network with sufficient bandwidth to handle the resulting data traffic. Alternatively, each component that needs to validate passcodes may have a copy of the database. Such an architecture, however, presents the drawback that it requires large amounts of data storage space to store multiple copies of the database on each network component, and also requires that up-to-date copies of the database be transmitted frequently to the various components. These frequent transmission also require a network with sufficient bandwidth.

In view of the foregoing, it is clear that there is a need for a passcode-validation technique that overcomes the drawbacks of the prior art.

SUMMARY OF THE INVENTION

The present invention provides a passcode-validation technique that greatly reduces the need for data transmission and storage. The present invention allows passcodes to be validated without performing remote database queries at the time of validation, and without requiring numerous copies of large databases to be stored locally at points throughout the telephone network.

In accordance with the present invention, a hash function is defined. The hash function receives a telephone number as input and produces a passcode as output, where the passcode is based on the telephone number. The passcode produced by the hash function may, for example, be a four-digit number from 0000–9999. At the time that a customer of the telephone network subscribes to a passcode-controlled service, the customer's telephone number is hashed using the defined hash function. The output of the hash function is provided to the customer and becomes the customer's passcode. The defined hash function is then provided to every component of the telephone network that may need to validate the customer's passcode. When those components are called upon to validate the customer's passcode, they hash the customer's telephone number using the defined hash function. In most passcode-controlled transactions, the customer's telephone number is either the called party number (when the customer is calling his own number from a remote location) or the calling party number (when the customer is calling from his own line), and thus the customer's number is generally available to such components as part of the normal call-processing protocol. Thus, upon hashing the customer's telephone number, the passcode that is entered by the customer is compared against the hash of the customer's telephone number. If the two values match, then the customer is allowed access to a passcode-controlled service.

The invention may be deployed within an Advanced Intelligent Network (AIN), wherein passcode-controlled services are provided by service nodes (SN). In such a case, the hash function is provided to each SN that provides a passcode-controlled service.

In accordance with one aspect of the invention, support is provided for changes to a customer's passcode. An exception list is created which maintains an entry for each customer whose passcode has changed from the hash value. The customer's new passcode is maintained in the exception list indexed by the hash value. Thus, when a component needs to validate a passcode, it first hashes the customer's telephone number and checks whether the hash value is in the exception list. If there is such a hash value, then the passcode in the exception list is used for comparison with the passcode that is entered during call processing. If there is no such entry in the exception list, then the customer's passcode has not been changed from the original hash value, so the passcode entered during call processing may be compared with the hash value in order to perform the validation.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview of an Exemplary Telephone Network

Referring now to the figures, a preferred embodiment of the system and method of the present invention will be described. Basic telephony concepts and terminology are used throughout the description as would be understood by one of skill in the art.

Figure 1:
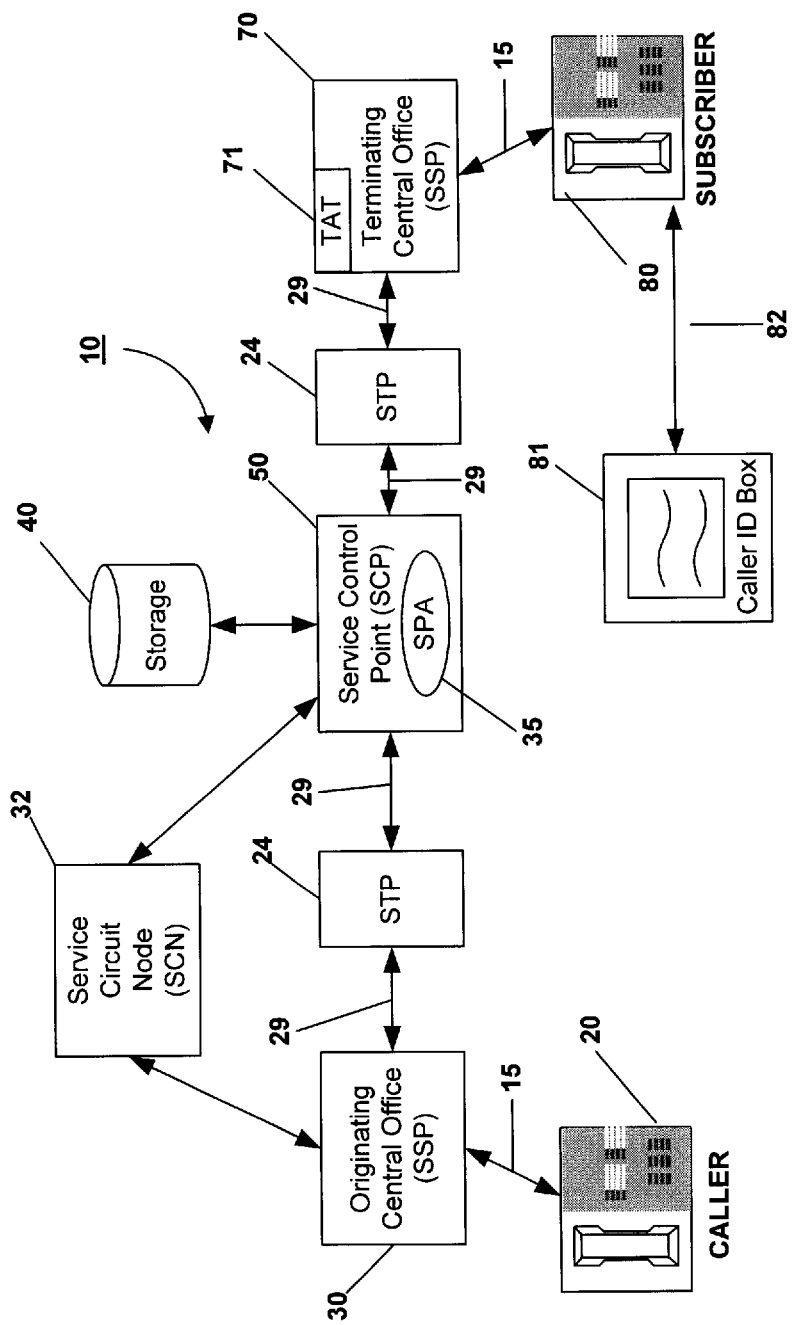
FIG 1 is a block diagram of an exemplary telephone network in which aspects of the invention may be implemented.

Referring now to FIG. 1, there is shown an exemplary telecommunications network 10 that connects a call between a caller 20 and a subscriber 80 in accordance with the present invention. This exemplary environment is the public switched telecommunications network (PSTN). A portion of the PSTN is illustrated in FIG. 1 and generally described below.

In particular, the detailed portion of the PSTN illustrates a part of the AIN of a typical local exchange carrier. For brevity, only a basic explanation of the PSTN is provided herein. Where the PSTN operates or is composed differently in an important aspect from that which would be understood by those skilled in the art, additional details are provided herein. For further information regarding the referenced PSTN and AIN aspects thereof, the interested reader is referred to the patent to Weisser, U.S. Pat. No. 5,430,719, which is incorporated herein by reference.

The AIN includes a variety of interconnected network elements. A group of such network elements includes the plurality of central offices 30, 70 which are service switching points (SSPs). A central office or SSP is a switch and the terms are used interchangeably herein. As further illustrated in FIG. 1, the SSPs 30, 70 have a plurality of subscriber lines 15 connected thereto. A subscriber line may also be referred to as a calling line. Each SSP serves a designated group of calling lines, and thus, the SSP or switch that serves a particular calling line may be referred to as its serving switch. Each calling line is connected typically to a piece of terminating equipment including a plurality of telephones designated, e.g., as 20, 80. Although telephones are illustrated as the pieces of terminating equipment in FIG. 1, those skilled in the art will understand that such pieces include other telecommunication devices such as facsimile machines, computers, modems, etc. It will also be understood that terminating equipment may be connected to, or associated with, various accessories, such as caller ID box 81 which displays identifying information about the caller at the time of call termination.

Pursuant to the preferred embodiment, each active calling line in an AIN is assigned a ten-digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 1, SSPs are interconnected by a plurality of trunk circuits. These are the voice path trunks that interconnect the SSPs to connect communications. The term "communication" or "call" is used herein to include all messages that may be exchanged between caller and called party in the network illustrated in FIG. 1. Each of the SSPs 30, 70 is connected to another type of AIN element referred to as a local signal transfer point (STP) 24 via respective data links 29. In one embodiment, these are data links employing a signaling protocol referred to as Signaling System 7 (SS7), which is well known to those skilled in the art. Much of the intelligence of the AIN resides in yet another type of AIN element referred to as a local service control point (SCP) 50 that is connected to STP 24 over an SS7 data link 29. Among the functions performed by the SCP 50 is the maintenance of network databases and subscriber databases, which may be stored in data storage object 40. Data storage object 40 is shown as a database communicatively coupled to SCP 50, although data storage object 40 may be embodied as a component within SCP 50, such as an internally-mounted hard disk device. The databases stored in data storage object 40 may be used in providing temporary telecommunications services to a customer. Typically, the SCP 50 is also the repository of service package applications (SPAs) 35 that are used in connection with or as part of the databases or other storage devices in the application of telecommunication services, enhanced features, or subscriber services to calling lines.

A set of triggers may be defined at the SSPs 30, 70. A trigger in the AIN is an event associated with a particular calling line that generates a packet to be sent to an SCP 50. The trigger causes the SCP 50 to query its database for processing instructions with respect to the particular call. The results of the database inquiry are sent back to the SSP in a response from the SCP 50 through the STP 24. The return packet includes instructions to the switch as to how to process the call. The instructions may be to take some special action as a result of a customized calling service, enhanced feature, or subscriber service. In response, the switch moves through its call states, collects the called digits, and generates further packets that are used to set up and route the calls. Similar devices for routing calls among various local exchange carriers are provided by regional STP and regional SCP. An example of a trigger is termination attempt trigger (TAT) 71, which causes a query to be sent to SCP 50 whenever an attempt is made to terminate a call on the line of subscriber 80.

The AIN may also include a service circuit node 32 (SCN), which may also be referred to herein as a service node. The SCN 32 includes voice and dual tone multi-frequency (DTMF) signal recognition devices and voice synthesis devices. In addition, the SCN 32 may include a data assembly interface. The SCN 32 is connected to the local SCP 50 via data links using an X.25 protocol. In addition, the SCN 32 typically is connected to one or more (but usually only a few) SSPs via Integrated Service Digital Network (ISDN) links.

Thus, each telephone set (e.g., caller 20 and subscriber 80) is connected via a telephone line 15 (e.g., POTS, or similar) to a telephone system including central office switches 30, 70, at least one STP 24, and at least one SCP 50. The SCP 50 contains control logic and feature data, and is a centralized node in the system. A SPA 35 processes calls and is running on the SCP 50. Each central office switch 30, 70 may be connected to a plurality of subscriber sets.

Additionally, the SCP 50 may provide routing instructions to a plurality of central offices. Connections 29 between the central offices 30, 70, the STP 24, and the service control point 50 are preferably TCP/IP high speed network connections (e.g., fiber optic, ethernet, etc.).

Figure 2:
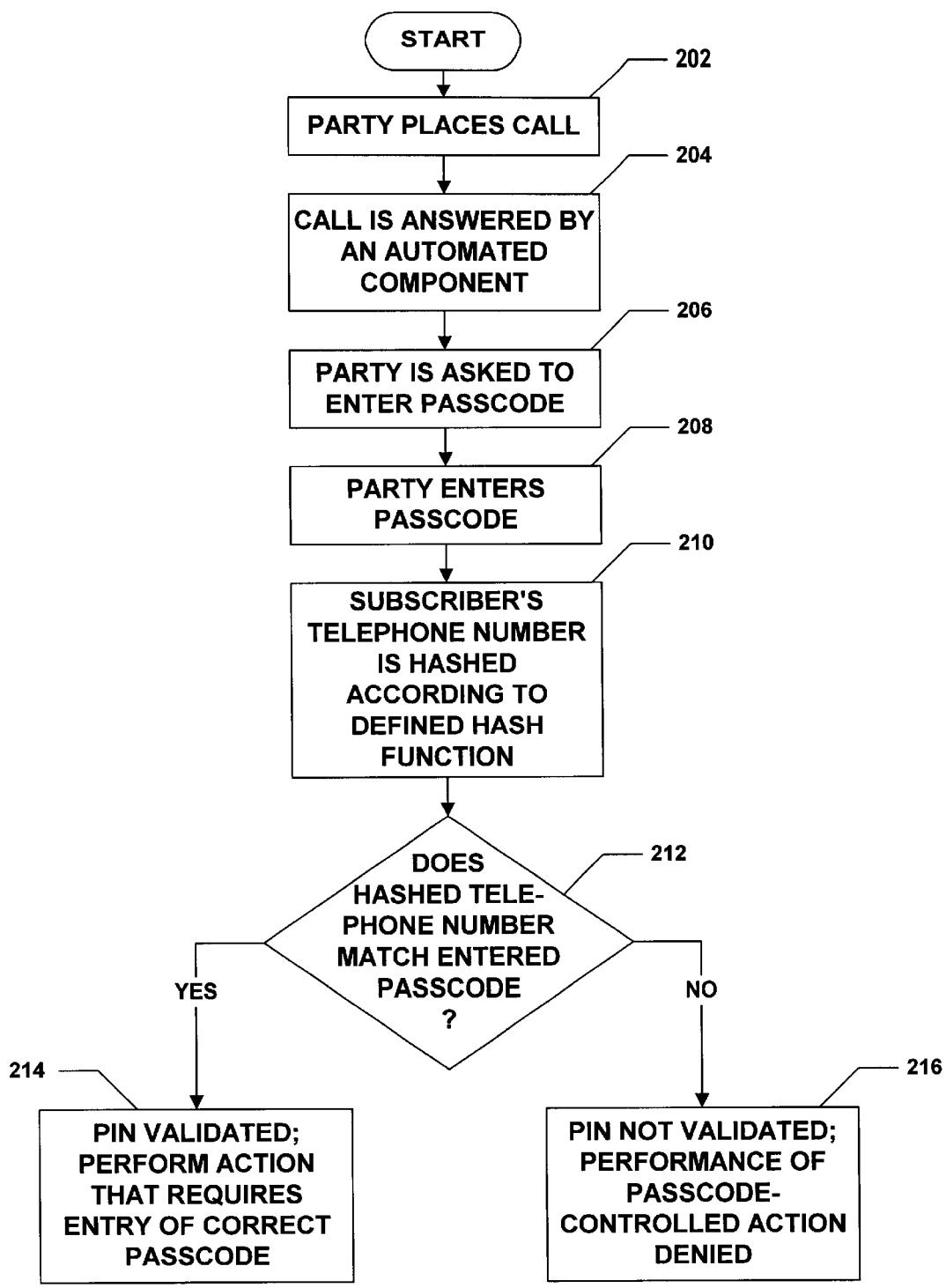
FIG. 2 is a flow diagram of a passcode validation process in accordance with the invention.

With reference to FIG. 2, a method is now described for validating a passcode or personal identification number (PIN) during call processing. The method of FIG. 2 may be implemented within the AIN depicted in FIG. 1. However, the method of FIG. 2 may be used to validate a passcode or PIN in any call processing environment, without departing from the spirit and scope of the invention.

Referring now to FIG. 2, a party places a call at step 202. An example of a "call" is the typical case in which a first party (the "calling party") places a call to a second party (the "called party") by dialing the directory number of the second party's telephone line. However, the "call" in the example of FIG. 2 encompasses any situation in which the calling party uses a telephone station to connect to another node on the network. For example, the calling party may be calling a server machine on the network in order to access a service offered by the provider of the telephone network. An example of such a service is voice mail, where the subscriber of the voice mail service dials a number to reach the voice mail server in order to retrieve messages or record a greeting. Such communications are considered "calls" in the example of FIG. 2, notwithstanding the fact that the call is not being placed from one customer on the network to another customer.

At step 204, the call placed by the calling party is answered by an automated component of the telephone network. An example of an "automated component" includes the voice mail server described in connection with step 202, wherein the calling party has placed a call to the voice mail server. However, voice mail servers are merely one example of an automated component that answers the call at step 204, and such voice mail servers are not limiting of the invention. Additionally, it should be noted that the call may be answered by an automated component of the network even if the call was not originally destined for such automated component. For example, in the AIN depicted in FIG. 1, the subscriber line 80 may have a termination attempt trigger (TAT) 71 provisioned thereon, which causes certain calls destined for subscriber 80 to be intercepted prior to termination and redirected to a service node 32 so that the network can gather more information. An example of that scenario is a "privacy manager" service (as described in U.S. patent application Ser. No. 09/372,676, entitled "System and Method for Privacy Management"), wherein calls from an unknown calling line (one for which there is no caller ID information or for which the caller ID information has been "blocked") are redirected to a service node, so that the service node can prompt the caller to unblock their number or record their name so that the called party can screen the call before it is terminated to the called party's line. When the subscriber to the "privacy manager" service is calling his own line from a remote location, he may enter a passcode during the prompt, thereby overriding the privacy manager service and allowing the call to be terminated to his own line. The receipt of a call by a service node in connection with such a "privacy manager" service is an example of an automated component's "answering the call" for the purpose of step 204.

At step 206, the calling party is optionally asked to enter a passcode or PIN. For example, in the case where the passcode-controlled service is voicemail, the party may be explicitly requested to enter a passcode. (E.g., the system may generate an audio prompt such as "Please enter your PIN.") However, there are situations in which there is no explicit request to enter a passcode. For example, in the "privacy manager" scenario described above, the service node asks the caller to unblock his number or record his name. However, the service node is programmed to accept a passcode in response to that prompt in order to override the privacy manager service, even though the audio prompt may not offer entry of a passcode as an option. Thus, the explicit request to enter a passcode at step 206 is an optional step.

At step 208, the calling party enters the passcode. In the typical case where the party is calling from a telephone station having a numerical keypad, the passcode will be entered in dual-tone multi-frequency (DTMF) format, although the passcode may be entered in any manner that allows the passcode to be transmitted over the telephone network.

At step 210, the subscriber's telephone number is hashed according to a predetermined hash function. Hash functions are known in the art, and a general description of such functions is provided below. Briefly, a hash function is a cryptographic function that accepts data (such as a string) as input, and produces a number based on the input. According to the invention, the passcode that controls access to a particular service is the hash of a telephone number, where the hash is obtained using a predetermined hash function. When a subscriber is assigned a passcode, the subscriber's telephone number is hashed according to the predetermined hash function. The same predetermined hash function is then provided to each component that may need to validate the subscriber's passcode, so that such components can regenerate the passcode from the subscriber's telephone number in order to compare the re-generated passcode with the passcode entered by the caller. Thus, the network component that performs the hash at step 210 is one of the components that has been provided with the predetermined hash function. For example, the predetermined hash function may be provided to a voice mail server (so that the voice mail server can validate the subscriber's passcode when the subscriber calls to retrieve messages), or by a service node (so that the service node can override a "privacy manager" service when the caller enters a valid passcode).

It should be noted that the subscriber's telephone number, which is hashed at step 210, may be either the calling party number or the called party number depending on context. For example, when a subscriber calls a voice mail server from his or her own line in order to retrieve voice mail messages, the calling party's number would be hashed. On the other hand, in the case where a passcode is used to override the subscriber's "privacy manager" service, the subscriber is calling his own number from a remote location, and thus it is the called party's number that gets hashed, since the passcode for such a service is properly bound to the subscriber's number, and not to the remote telephone station from which the subscriber is calling. As another alternative, the calling party may be asked to enter a telephone number to be hashed. For example, if the subscriber of a voice mail service calls to retrieve messages from a remote location (i.e., not from his home telephone line), the subscriber may be asked during the call to enter his home telephone number, since neither the calling party number nor the called party number in such a call is the subscriber's telephone number (which is the number that needs to be hashed).

At step 212, the entered passcode (i.e., the passcode that was entered at step 208) is compared with the hash of the subscriber's telephone number (i.e., the hash computed at step 210). If the two numbers match, then the process continues to step 214. Otherwise, the process continues to step 216.

At step 214 (which is reached if the entered passcode matches the hash value), the entered passcode is determined to be valid, and the network performs an action for which entry of a valid passcode is required. As noted above, the invention applies to any service to which access may be controlled by a passcode, and is not limited to any such service. Accordingly, step 214 is not limited to the performance of any particular action. The "action" performed at step 214 is an action to which access may appropriately be controlled by a passcode. In the examples above, such an action may include permitting the caller to retrieve voice mail messages, or overriding the privacy manager service on the subscriber's line.

On the other hand, if the numbers compared at step 212 do not match, then step 216 is reached, at which point it is determined that the passcode has failed to validate. In such a case, access to a passcode-controlled action is denied.

Hash Functions

As noted above, the process of FIG. 2 makes use of a "hash function." Hash functions are well known in the art, and thus we only provide a brief description of hash functions herein.

Figure 3:
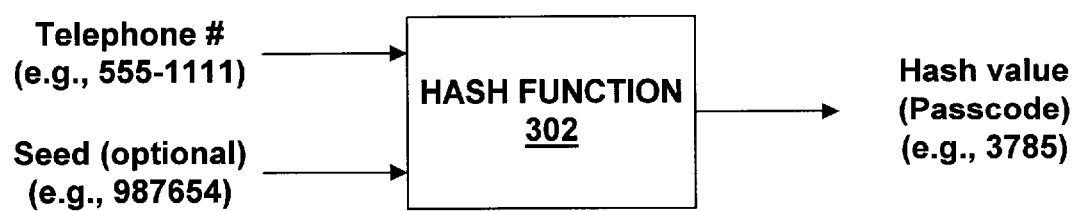
FIG. 3 is a block diagram of an exemplary hash function for use in accordance with the invention.

In general, a hash function is a mathematical operation that takes a string of characters as input and produces a fixed-length key as output, where the key is representative of the input string. The present invention provides a specific example of this: a hash function used in accordance with the invention takes a telephone number as input (where the telephone number is a character string) and produces a four-digit passcode (i.e., an integer in the range of 0–9999) as output. FIG. 3 shows an exemplary hash function 302. Hash function 302 receives, as input, a telephone number (404-555-1111, in the example). Hash function 302 may also receive a "seed." Hash function 302 produces a value as output based on the telephone number and the optional seed. In the example of FIG. 3, the output value becomes the passcode (e.g., 3785). The seed is a number that hash function 302 may use as a basis for performing its mathematical operations. Thus, the same hash function 302 can be used to produce a different set of hash values for the same telephone numbers simply by using a different seed.

Ideally, the hash function is chosen such that it will distribute its expected input even across the range of output. Thus, the hash function should not tend to "cluster" passcodes at any particular value. For example, over a range of telephone numbers, it should not be the case that a particular passcode (e.g., 4567) is generated by the hash function appreciably more often than other passcodes.

Examples of hash functions are:

The division-remainder method: The size of the range of the output is used as a divisor into the original input value. (I.e., if the range of output is 0–9999, then the divisor would be 10,000, since there are 10,000 different integer values between 0–9999.)

Folding: This method divides the original value (digits in this case) into several parts, adds the parts together, and then uses the last four digits (or some other arbitrary number of digits) as the hashed value or key.

Radix transformation: Where the value or key is ditigal, the number base (or radix) can be changed resulting in a different sequence of digits. (For example, a decimal numbered key could be transformed into a hexadecimal numbered key.) High-order digits could be discarded to fit a hash value of uniform length.

Digit rearrangement: This is simply taking part of the original value or key (e.g., digits in positions 3 through 6), reversing their order, and then using that sequence of digits as the hash value or key.

Other types of hash functions are well-known in the field of cryptography. Such functions include the message-digest hash functions MD2, MD4, and MD5, used for hashing digital signatures into a shorter value called a message digest, and the Secure Hash Algorithm (SHA), which produces a 60-bit message digest and is similar to MD4.

Use of Alternative Passcodes

It will be observed that the passcode validation method described above supports only a single passcode for each subscriber's number. Since the hash function is deterministic, it always produces the same passcode for a given subscriber telephone number. However, in some cases, a subscriber may wish to use a different passcode than the one originally assigned. Preferably, a system according to the invention permits a subscriber to change his or her passcode from that which was originally assigned. A technique for supporting such a change is now described.

An "exception" list may be created, which contains the passcodes for those subscribers whose passcode has been changed from that generated by the predefined hash function. The exception list may be provided to each component that needs to validate passcodes. As noted above, one purpose of using hashing instead of database lookups to validate passcodes is to prevent the need to transmit and store large amounts of passcode data on each component that needs to validate passcodes. However, if most subscribers use their originally-assigned passcodes rather than a new passcode, the size of the exception list will likely be small and can easily be stored on each component that validates passcodes.

Figures 4, 5:
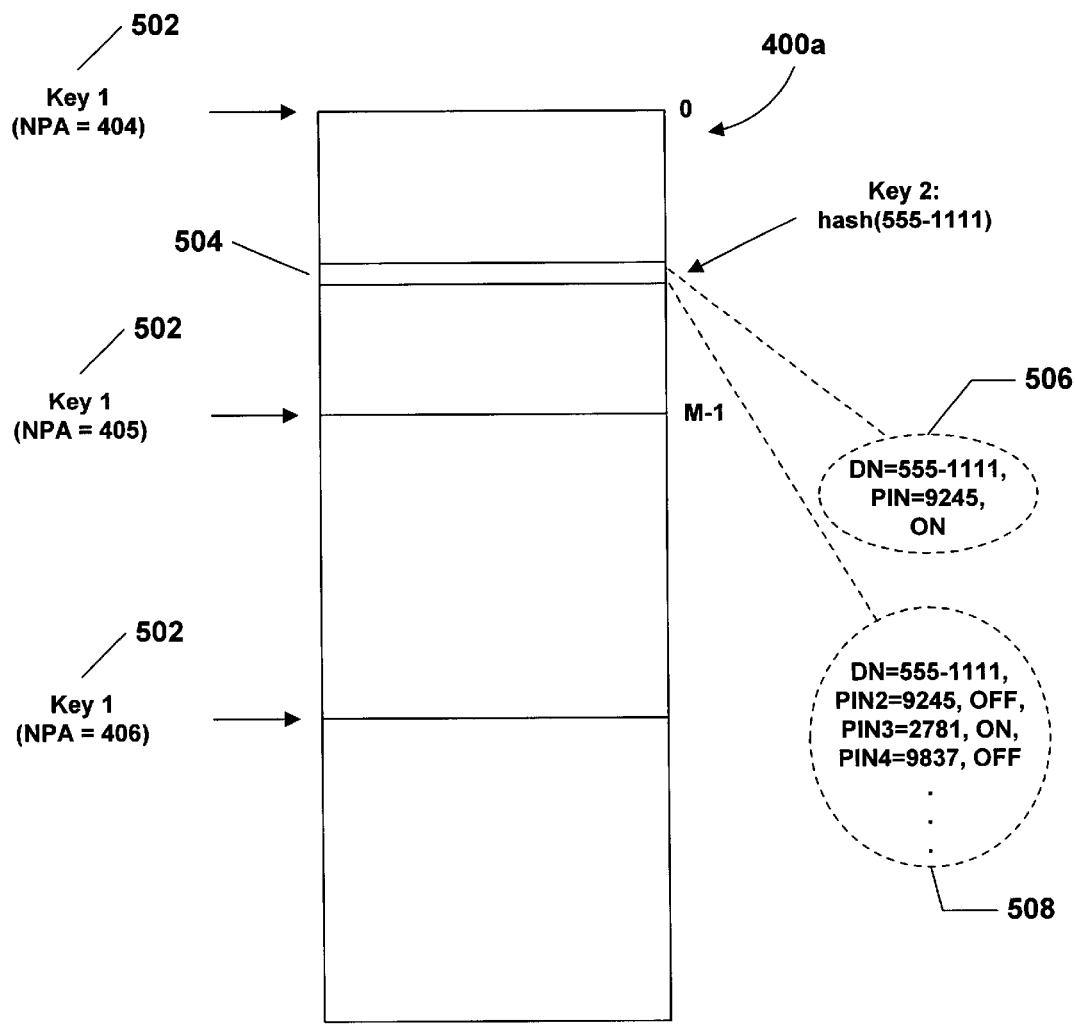
FIG. 4 is a diagram of a first exemplary embodiment of an exception table.
FIG. 5 is a diagram of a second exemplary embodiment of an exception table.

FIG. 4 shows an exemplary exception list 400. In the example of FIG. 4, exception list is a table containing the hash values of subscriber's telephone numbers, correlated with their new passcodes, although exception list 400 may have any appropriate format or structure, as would be apparent to those of skill in the art. In the example of FIG. 4, each row of exception list 400 has an entry containing the hash of the subscriber's telephone number (column 1), and an entry containing the customized passcode for that telephone number (column 2).

In order to use the exception list, a hash of the subscriber's telephone number is obtained at step 210 of FIG. 2. However, instead of comparing the entered passcode against the hash value, the hash value is used as an index into the exception list table, and the entered passcode is then compared against the passcode listed in the exception table.

While FIG. 4 shows a simplified exception list, FIG. 5 shows a preferred structure for an exception list 400a. Exception list 400a is segmented by the area codes ("NPAs") of the subscribers' telephone numbers. For example, all subscribers whose telephone number has an NPA of "404" are placed in one segment 502 of the exception list. Within each segment 502, the passcode data for the subscriber is located at an offset into the segment that is equal to the hash of the subscriber's seven-digit telephone number. Thus, if there are M locations within a segment (labeled 0 through M−1), and the hash of a subscriber's seven-digit telephone number is H, then the subscriber's passcode data is located at offset H into the segment for the subscriber's NPA. Thus, in the example of FIG. 5, where the subscriber's telephone number is 404-555-1111, the subscriber's passcode data is stored at location 504.

In accordance with the structure described above, any location in the table can be identified by a double-index comprising two keys (key1 and key2 in the example). The first key (key1) is the NPA of the telephone number, and the second key (key2) is the hash of the seven-digit telephone number. This index can be described by the tuple (key1, key2). For example, if the subscriber's telephone number is 404-555-1111, then the location of any exception data for that subscriber is described by the tuple (404, hash(555-1111)). Therefore, in order to locate this exception data, first the offset for the segment corresponding to NPA 404 is located; the value hash(555-1111) is then added to this offset to produce the absolute location in the exception list of the passcode data for this subscriber.

The size of each segment M is chosen such that the segment can store the anticipated number of passcodes for a given NPA. For example, if there are 5,000,000 telephone numbers having an NPA of 404, and it is expected that 10% of those subscribers will need non-standard passcodes (i.e., passcodes other than that produced by the predefined hash function), then 500,000 locations may be allotted for each segment. Moreover, since some subscribers' seven-digit telephone numbers will hash to the same value, there needs to be a "collision rule" for resolving those situations in which two subscribers having the same hash value both have passcodes that need to be placed on the exception list. An example of such a "collision rule" is that if the location identified by the tuple (NPA, hash(seven-digit-number)) is occupied, then the next free location is used.

FIG. 5 shows two exemplary formats 506 and 508 for the data stored in each entry of the exception list. Exemplary entry 506 contains the directory number (DN), followed by the new passcode (PIN=9245), followed by an indication that the exception feature is "ON" for that customer. ("On" means that a passcode from the exception list is in effect for that customer; "off" would mean that the passcode in the exception list is not in effect for that customer.) Including the directory number in the entry allows for resolution of collisions. That is, since two customers on the list may hash to the same value, when (key1, key2) is used to locate the passcode data, the customer's directory number can be checked against the number in the list to ensure that the located data actually pertains to the customer whose passcode is being validated. If the customer's directory number does not match the directory number in the entry, then the system can check the next entry (and the next, and so on), until it finds an entry showing the correct directory number.

Exemplary entry 508 shows a different method of maintaining exception data. In such a case, a list of potential passcodes (PIN2, PIN3, PIN4, etc.) is maintained in each entry. (PIN1 is the "standard" passcode produced by the predefined hash function, and thus it does not need to be on the exception list.) Each such passcode is followed by "ON" or "OFF." Only one passcode is listed as "ON," and the rest are "OFF." The passcode marked as "ON" is the passcode that is actually in effect for the customer. The remainder of the passcode are different passcodes that could be turned "on" or "off," should the customer wish to change the passcode again. As with entry 506, entry 508 contains the directory number of the customer to whom the exception data pertains, which assists in resolving collisions.

It should be noted that the exception list supports the choosing of "customized" passcodes by customers—i.e., a customer may request a particular passcode that he or she finds easy to remember, and may request that the customized passcode be inserted into the exception list. However, it may be preferable to limit the passcode-change process to reassigning a new random passcode to customers who request one, thereby discouraging large numbers of passcodes from being placed on the exception list. (It will be recalled that one feature of the invention is that it permits passcodes to be validated without maintaining large databases, and encouraging every customer to have a non-standard passcode that needs to be on the exception list would thwart this goal.) One particularly advantageous technique for reassigning passcodes is to define a plurality of hash functions, where each hash function produces (or, rather, is likely to produce) a different passcode. (The plurality of hash functions may simply be a single hash function with a plurality of different seeds, as explained above in connection with FIG. 3.) Thus, entry 508 may contain all of the passcodes that would be produced by the plurality of hash functions, and a change in the customer's passcode can thus be accomplished by searching for the current "ON" passcode, turning it to "OFF," and turning the next passcode in the list to "ON." The number of hash functions could be sufficiently high (say 20), such that a customer is not likely to request a passcode change often enough to exhaust the set of permissible passcodes.

Figure 6:
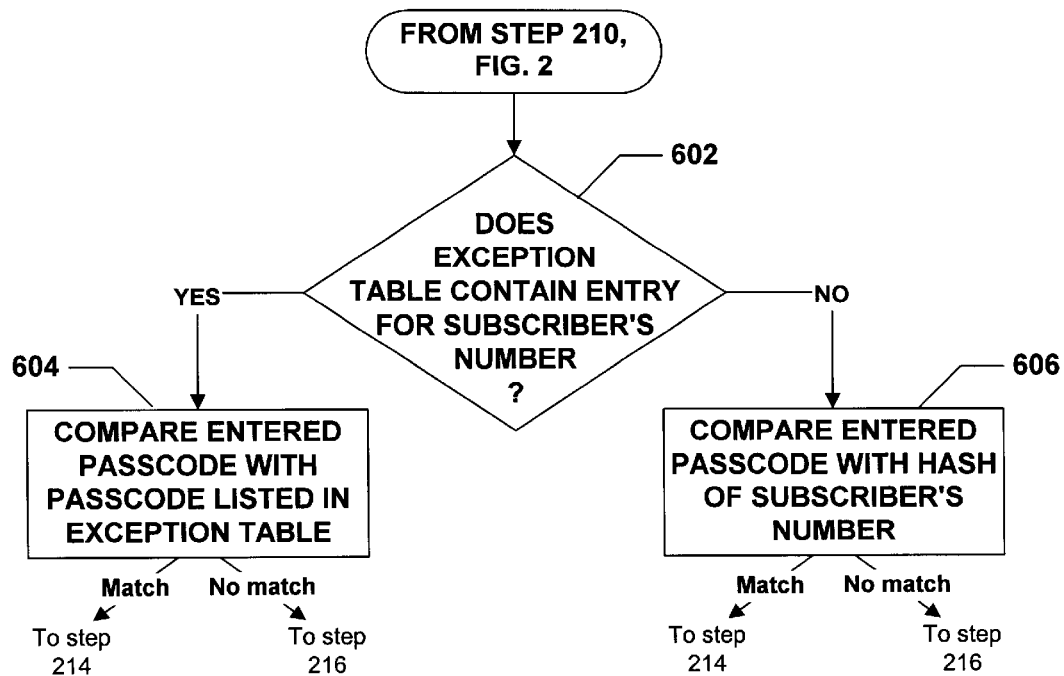
FIG. 6 is a flow diagram of an exemplary process for validating a passcode in a system that employs an exception table.

FIG. 6 is a flow diagram showing the steps used to validate a passcode when an exception list is present. The steps shown in FIG. 6 augment FIG. 2 by adding, between steps 210 and 212, the additional process of determining whether the hash of the subscriber's telephone number is present in the exception table. The process of FIG. 6 begins following the hashing of the subscriber's telephone number at step 210 in FIG. 2. From there, the process proceeds to step 602, where it is determined whether an entry for the subscriber is present in the exception table (e.g., by looking for the location indicated by the tuple (NPA, hash(seven-digit-number)), comparing the directory number in the entry with the subscriber's number, and following the collision rule if necessary). If such an entry is present in the exception table, then the passcode located in that entry is compared with the passcode entered by the caller (step 604). If the entered passcode matches the passcode from the exception table, then the entered passcode is valid, and the process continues to step 214 of FIG. 2. If the entered passcode does not match the passcode in the exception table, then the entered passcode is not valid and the process continues to step 216 of FIG. 2.

If it is determined at step 602 that the exception table does not contain an entry for the subscriber's number, then the process continues to step 212 of FIG. 2, where the hash value may be compared with the entered passcode. In other words, if the hash value is not present in the exception table, then the entered passcode is compared with the hash value—just as if there were no exception table.

Thus, by maintaining an exception table and using the hash value as an index into such exception table, a small list of customized passcodes may be maintained for those subscribers whose passcodes have been changed, while still allowing a hash value to be used as the passcode for most subscribers. In this manner, an exception table greatly reduces the need for data lookup in the passcode validation process, while still providing a mechanism for data lookup in the small number of situations where it may be necessary.

Figure 7:
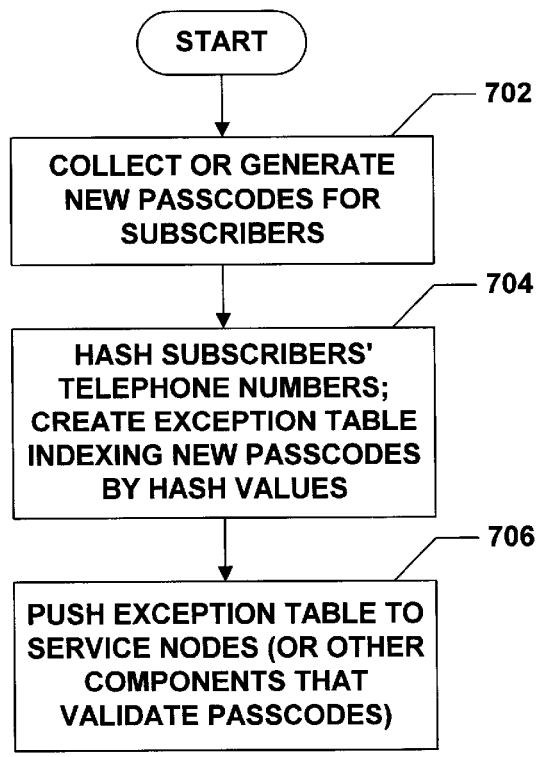
FIG. 7 is a flow diagram of an exemplary process for creating and updating an exception list.

One aspect of using an exception table is that it must be provided to every component that needs to be able to validate passcodes (e.g., service circuit nodes 32, shown in FIG. 1). Thus, a procedure must be in place to provide the exception table to all such components. FIG. 7 shows an exemplary process of creating and providing the exception table.

At step 702, new passcodes are either collected or generated for subscribers. The customized passcodes may be collected/generated in a variety of ways, and under a variety of circumstances, without departing from the spirit and scope of the invention. For example, a subscriber may call the provider of the telephone network to indicate that he or she wants a particular passcode (e.g., one that is easy for the subscriber to remember). In this case, the subscriber may select the passcode (although, as noted above, there may be reasons not to allow the customer to select the passcode). Alternatively, the subscriber may indicate that his or her passcode has become compromised, and that he or she wishes to obtain a new one. In such a case, the telephone network provider may assign a new passcode randomly, or according to the plurality of hash functions discussed above.

When the new passcodes are generated or selected, the telephone numbers of the subscribers to whom those new passcodes relate are hashed at step 704. Also at step 704, an exception table is created which correlates the hash of the subscriber's telephone number with the new passcode. At step 706, the exception table is "pushed" to all components that may need to validate passcodes. The "push" may take place in any manner that allows data to be communicated between points on a network. For example, a data network (e.g., a TCP/IP network, etc.) may exist to transmit administrative information to the various points in the telephone network, and such data network may be used to transmit the exception table to various service nodes. The data network may be a "shared-use" network that is used for various administrative functions thus, it may be advantageous to perform the "push" at times when the data network is not busy. For example, it may be convenient to transmit a new exception list to the service nodes at night when data traffic is low.

It should be noted that it is preferable to perform the process of FIG. 7 frequently, in order to ensure that each component that validates passcodes has an up-to-date exception list. For example, all of the customized passcodes that are assigned in a given day m ay be collected throughout the day, and a new exception table incorporating the entire day's passcodes may be pushed to the various components at the end of the day (or during the night).

Example: Using a Passcode to Override a Privacy Manager Service

What follows is a more detailed description of the deployment of the invention in a privacy manager service, where a passcode is used to override the service. When a customer of a telephone network subscribes to a privacy manager service, calls to the subscriber's line that are received from locations that have blocked their caller ID, or whose identity is not known to the telephone network, are screened before terminating the call to the subscriber's line. Particularly, when a call is received from a "blocked" line, the network asks the caller to unblock caller ID, and when the call comes from an "unknown" line the network asks the caller to record his or her name. Such a service may be implemented by provisioning a termination attempt trigger (TAT) on the subscriber's line, which causes a query to be sent to the service control point (SCP) whenever an attempt is made to terminate a call to the subscriber's line. The SCP, in turn, causes calls from "blocked" or "unknown" number to be redirected to a service node, which generates the request to unblock the number or record the caller's name.

Such a service, however, can be problematic when the subscriber is calling his or her own line from a remote location. For example, the subscriber may be calling for a location (e.g., government, police station, etc.) that does not permit caller ID unblocking. Thus, the subscriber may wish to override the privacy manager service so that the call may be terminated to his line. Such a "privacy manager override" is an example of a passcode-controlled service. Thus, the service node may accept entry of a correct passcode, during the prompt to unblock the number or record the caller's name, as an indication that the privacy manager service may be overridden and that the call may be terminated to the subscriber's line.

Figure 8:
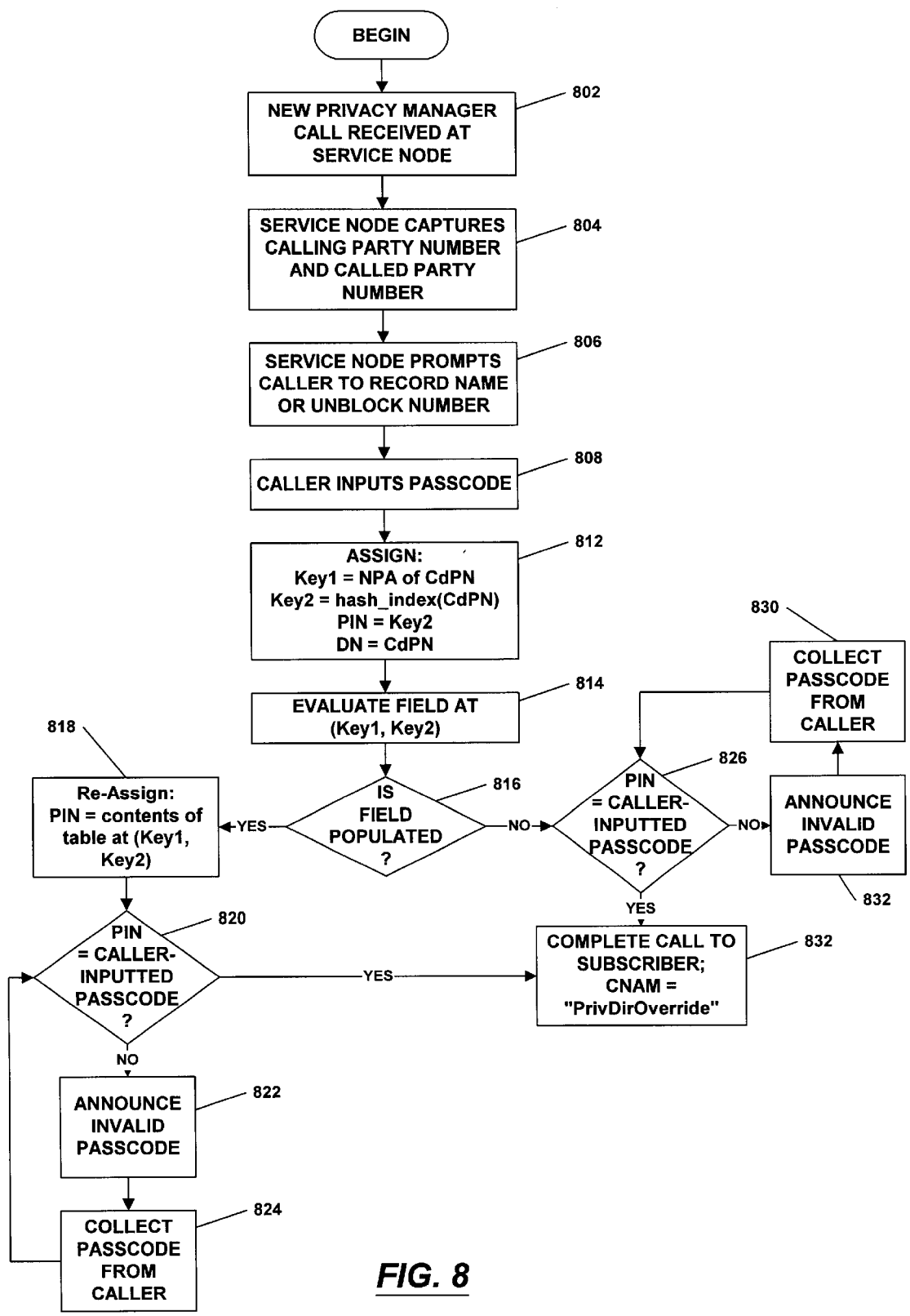
FIG. 8 is a flow diagram of an exemplary process by which the passcode validation technique of the present invention is used with the override feature of a privacy manager service.

FIG. 8 shows an exemplary process by which a caller uses a passcode to override a privacy manager service when calling his own line from a remote location. At step 802, a service node receives a call placed by the caller. In general, the call is received at the service node because it has been redirected there by the network. Typically, a termination attempt trigger (TAT) provisioned on the subscriber's line causes a query to go up to the service control point (SCP), which determines that the called party is subscribed to the privacy manager service, and also determines that the calling party number is either unknown or blocked. This determination results in the SCP's instructing the service switching point (SSP) to redirect the call to a service node. There may be multiple service nodes that handle such privacy manager calls, and the call may be answered by any one of such service nodes.

At step 804, the service node captures the calling party number (if known) and the called party number. The service node then prompts the caller to either unblock the number or to record the caller's name (step 806). In response to such prompt, the caller inputs a passcode or PIN (step 808). As previously noted, the caller's entry of a passcode or PIN is not directly responsive to the prompt. That is, the service node prompts the caller either to unblock the calling number or record the caller's name, and yet the caller responds by entering a passcode or PIN. However, the entry of a passcode or PIN is, in effect, a "private interface" to the system—that is, the service node is programmed to accept a passcode or PIN, even though the option to enter such passcode or PIN is known only to those familiar with the privacy manager service (e.g., such an option is known to subscribers to the privacy manager service).

At step 812, the service node assigns various values. Specifically, assuming that an exception table exists and is organized as in FIG. 5, the service node assigns: Key1=NPA of CdPN; Key2=hash index(CdPN) (where "hash_index" is the hash function used to create and verify passcodes); PIN=Key2; and DN=CdPN. At step 814, the field in the exception table identified by (Key1, Key2) is evaluated. At step 816, a determination is made as to whether the field identified by (Key1, Key2) is populated. If the field is populated, then the value PIN is reassigned to equal the contents of the field identified by (Key1, Key2). In other words, because an entry in the exception table exists for the hash of the subscriber's telephone number, the PIN is no longer that hash, but rather the value in the exception table that is indexed by the hash. As noted above, a collision rule may need to be employed in order to locate the exception data pertaining to the subscriber.

At step 820, a determination is made as to whether the value PIN is equal to the passcode supplied by the caller. If the two values are equal, then the call is terminated to the subscriber, and the CNAM field provided to the subscriber's line is set to "PrivDirOverride," or some equivalent message, so that an indication will appear on the subscriber's caller ID equipment indicating that the privacy manager feature has been successfully overridden. If the value PIN does not equal the passcode supplied by the caller, then the process proceeds to step 822, where the service nodes announces to the caller that an invalid passcode was entered and that the caller should "try again." The service node proceeds to collect a new set of digits from the caller (step 824) and returns to step 820 to attempt to revalidate the passcode.

Returning now to step 816, if it is determined at that step that the field identified by (Key1, Key2) is not populated, then there is no exception table entry for the subscriber's number. Thus, the subscriber's passcode is simply the hash value obtained by hashing the subscriber's telephone number (which is the value that PIN had been set to at step 812. In this case, the process continues to step 826, wherein a determination is made as to whether the value PIN is equal to the passcode entered by the subscriber. If the two values do not match, then the service node announces that an invalid passcode was entered and prompts the caller to enter a new passcode (step 828). New digits are then collected from the caller (step 830), and the process returns to step 826 to attempt to revalidate the passcode.

If step 826 results in a determination that the value PIN is equal to the entered passcode, then the process continues to step 832, whereby the call is terminated to the subscriber's line with the CNAM field equal to "PrivDirOverride" or some similar message, as discussed above.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of validating a passcode in a telecommunications network which processes a call from a first telephone station, said method comprising the acts of:

receiving a passcode from said first telephone station;

computing a first value based on a telephone number;

retrieving a second value from an exception table based on said first value;

determining that the received passcode is the same as said second value; and permitting access to a restricted service, wherein said exception table comprises a plurality of segments indexed by a numbering plan area, each of said segments comprising a plurality of storage locations, and wherein said retrieving act comprises:

identifying a first of said plurality of segments based on the area code of said telephone number;

identifying a first storage location within said first segment based on said first value; and retrieving said second value from said first storage location.

2. The method of claim 1, wherein the act of identifying a storage location comprises:

identifying a second storage location within said first segment based on said first value;

determining that said second storage location is not associated with said telephone number; and following a collision rule to locate said first storage location.

3. The method of claim 2, wherein said second storage location is located at an offset into said first segment equal to said first value, wherein each of the plurality of storage location that is in use for the storage of data stores the telephone number with which the data in the storage location is associated, and wherein said act of determining that said second storage location is not associated with said telephone number comprises comparing said telephone number with the telephone number in said second storage location.

4. The method of claim 3, wherein said collision rule comprises examining the next storage location said first segment.

5. The method of claim 1, wherein each of said storage locations that is in use for the storage of data stores:

a telephone number with which the data in the storage location is associated;

a plurality of values; and for each of said plurality of values, a binary indication of whether the value is valid or not valid;

and wherein said act of retrieving said second value from said first storage location comprises selecting one of the plurality of values in the first storage location based on the binary indications.

6. An advanced intelligent network comprising:

a service switching point communicatively connected to a plurality of telephone stations, each of said telephone stations having a directory number associated therewith; and a plurality of service nodes communicatively coupled to said service switching point, each of said service nodes comprising:

a processor;

a memory;

logic stored in said memory and executable on said processor which receives a directory number associated with one of said telephone stations and a passcode entered through one of said telephone stations, which hashes the received directory number according to a first hash function to produce a hash value, which compares the hash value with the entered passcode, and which allows access to a restricted service provided by the service node according to whether the entered passcode matches the hash value, wherein each of said service nodes further comprises:

an exception table having a plurality of custom passcodes indexed by hash values; and logic stored in said memory and executable on said processor which queries said exception table for a custom passcode in said exception table based on said hash value, and which compares the entered passcode with either the hash value or the custom passcode according to whether said exception table contains a custom passcode indexed by said hash value.

7. A method of validating a passcode in a telecommunications network which processes a call from a first telephone station, said method comprising the acts of:

receiving said passcode from said first telephone station;

computing a value based a telephone number;

determining that the received passcode is the same as the computed value; and permitting access to a restricted service, wherein said determining act is performed without consulting a database of passcodes.

8. A method of supporting the evaluation of passcodes in a telephone network having a plurality of customers, said method comprising the acts of:

hashing the telephone number of each of said plurality of customers using a first hash function, to produce a hash value for each of said plurality of customers;

assigning each of said plurality of customers a passcode equal to the customer's corresponding hash value; and providing said first hash function to a plurality of components of said telephone network, wherein said method does not include providing, to said plurality of components, a database containing passcodes assigned to said customers.

9. An advanced intelligent network comprising:

a service switching point communicatively connected to a plurality of telephone stations, each of said telephone stations having a directory number associated therewith; and a plurality of service nodes communicatively coupled to said service switching point, each of said service nodes comprising:

a processor;

a memory;

logic stored in said memory and executable on said processor which receives a directory number associated with one of said telephone stations and a passcode entered through one of said telephone stations, which hashes the received directory number according to a first hash function to produce a hash value, which compares the hash value with the entered passcode, and which allows access to a restricted service provided by the service node according to whether the entered passcode matches the hash value, wherein said logic allows access to said restricted service without comparing the entered passcode with a set of passcodes stored in a database.

* * * * *